(12) United States Patent
Juenemann et al.

(10) Patent No.: US 11,338,543 B2
(45) Date of Patent: May 24, 2022

(54) LIGHT-PERMEABLE MULTI-LAYER COMPOSITE FILM

(71) Applicant: Benecke-Kaliko AG, Hannover (DE)

(72) Inventors: Jens Juenemann, Suterode (DE); Kristina Hahn, Hannover (DE)

(73) Assignee: Benecke-Kaliko AG, Hannover (DE)

( * ) Notice: Subject to any disclaimer, the term of this patent is extended or adjusted under 35 U.S.C. 154(b) by 125 days.

(21) Appl. No.: 16/642,945

(22) PCT Filed: Jun. 12, 2018

(86) PCT No.: PCT/EP2018/065417
§ 371 (c)(1),
(2) Date: Feb. 28, 2020

(87) PCT Pub. No.: WO2019/042610
PCT Pub. Date: Mar. 7, 2019

(65) Prior Publication Data
US 2020/0346428 A1    Nov. 5, 2020

(30) Foreign Application Priority Data

Sep. 1, 2017  (DE) ...................... 10 2017 215 369.5

(51) Int. Cl.
*B32B 3/30*  (2006.01)
*B32B 5/02*  (2006.01)
(Continued)

(52) U.S. Cl.
CPC ................ *B32B 5/02* (2013.01); *B32B 3/266* (2013.01); *B32B 3/30* (2013.01); *B32B 5/024* (2013.01);
(Continued)

(58) Field of Classification Search
None
See application file for complete search history.

(56) References Cited

U.S. PATENT DOCUMENTS

| 5,601,928 A | 2/1997 | Katayama et al. |
| 5,759,924 A * | 6/1998 | Sahlin .................. D06N 3/04 156/308.2 |

(Continued)

FOREIGN PATENT DOCUMENTS

| CA | 2454911 A1 | 2/2003 |
| CN | 101883886 A | 11/2010 |

(Continued)

OTHER PUBLICATIONS

Machine Translation of JP-09304602-A, Nov. 1997 (Year: 1997).*
(Continued)

*Primary Examiner* — Jeffrey A Vonch
(74) *Attorney, Agent, or Firm* — David L. Cate; Gregory Adams

(57) ABSTRACT

Light-permeable multilayer composite film made of plastic as the surface coating of an article, wherein the composite film comprises at least one outer, at least partially light-permeable top layer optionally provided with a lacquer and at least one further layer arranged on the back of the top layer, wherein arranged on the back side of the top layer is at least one sheetlike, optically active textile layer, preferably a textile layer comprising threads made of polyethylene terephthalate (PET) and/or made of polyvinylidene fluoride (PVDF), wherein the textile layer has light-transmitting, light-refracting and light-reflecting properties or a combination thereof and the transmission, refraction and reflection properties are such that illumination of the textile layer, in particular back side illumination of the textile layer, results in preferably uniformized light transmission through the top layer.

8 Claims, 2 Drawing Sheets

Figure 1:
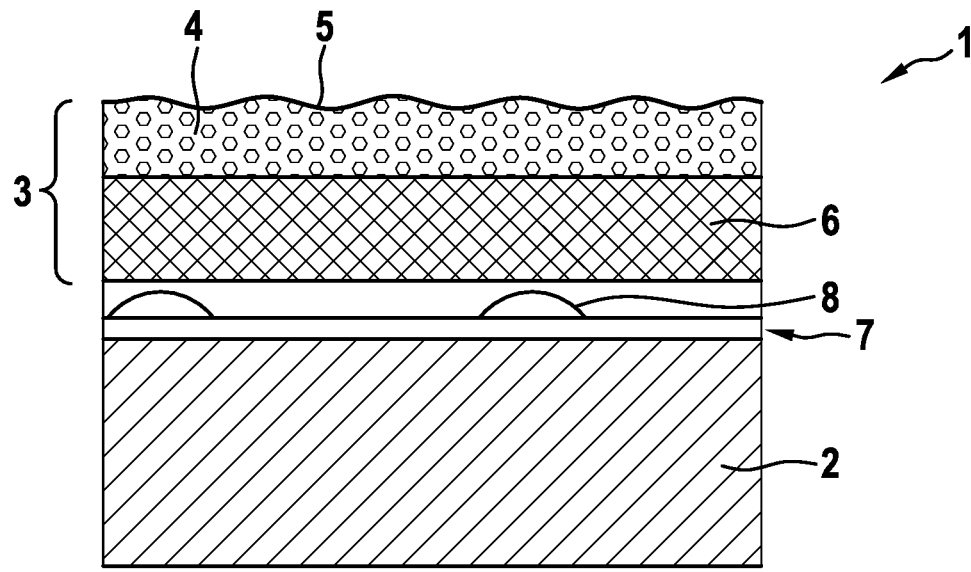

(51) Int. Cl.

| | |
|---|---|
| *B32B 7/02* | (2019.01) |
| *B32B 27/02* | (2006.01) |
| *B32B 27/06* | (2006.01) |
| *B32B 27/12* | (2006.01) |
| *B32B 33/00* | (2006.01) |
| *G02F 1/13357* | (2006.01) |
| *G02B 5/02* | (2006.01) |
| *B60R 13/02* | (2006.01) |
| *B32B 3/26* | (2006.01) |
| *B32B 5/24* | (2006.01) |
| *B32B 27/32* | (2006.01) |
| *B32B 27/36* | (2006.01) |
| *B32B 7/023* | (2019.01) |
| *B32B 27/30* | (2006.01) |
| *B60Q 3/54* | (2017.01) |
| *G02B 5/00* | (2006.01) |
| *B32B 5/18* | (2006.01) |
| *B60Q 3/14* | (2017.01) |
| *B60Q 3/64* | (2017.01) |
| *F21Y 115/10* | (2016.01) |
| *F21Y 103/10* | (2016.01) |
| *F21Y 105/10* | (2016.01) |
| *B60Q 3/74* | (2017.01) |
| *D03D 13/00* | (2006.01) |
| *D03D 15/49* | (2021.01) |
| *D03D 15/283* | (2021.01) |
| *D03D 15/37* | (2021.01) |
| *D03D 15/40* | (2021.01) |
| *D03D 1/00* | (2006.01) |
| *D03D 15/547* | (2021.01) |
| *G02F 1/1335* | (2006.01) |
| *F21V 8/00* | (2006.01) |

(52) U.S. Cl.
CPC .............. *B32B 5/026* (2013.01); *B32B 5/245* (2013.01); *B32B 7/023* (2019.01); *B32B 27/02* (2013.01); *B32B 27/06* (2013.01); *B32B 27/12* (2013.01); *B32B 27/304* (2013.01); *B32B 27/32* (2013.01); *B32B 27/327* (2013.01); *B32B 27/36* (2013.01); *B32B 33/00* (2013.01); *B60Q 3/54* (2017.02); *G02B 5/00* (2013.01); *G02B 5/021* (2013.01); *G02B 5/0236* (2013.01); *G02B 5/0247* (2013.01); *G02B 5/0278* (2013.01); *A47B 2220/0077* (2013.01); *B32B 3/263* (2013.01); *B32B 5/028* (2013.01); *B32B 5/18* (2013.01); *B32B 27/065* (2013.01); *B32B 2250/24* (2013.01); *B32B 2255/10* (2013.01); *B32B 2255/26* (2013.01); *B32B 2262/0238* (2013.01); *B32B 2262/0284* (2013.01); *B32B 2266/0235* (2013.01); *B32B 2274/00* (2013.01); *B32B 2305/022* (2013.01); *B32B 2305/186* (2013.01); *B32B 2305/188* (2013.01); *B32B 2307/408* (2013.01); *B32B 2307/414* (2013.01); *B32B 2307/416* (2013.01); *B32B 2307/418* (2013.01); *B32B 2323/00* (2013.01); *B32B 2327/12* (2013.01); *B32B 2367/00* (2013.01); *B32B 2451/00* (2013.01); *B32B 2479/00* (2013.01); *B32B 2551/00* (2013.01); *B32B 2605/003* (2013.01); *B32B 2605/006* (2013.01); *B60Q 3/14* (2017.02); *B60Q 3/64* (2017.02); *B60Q 3/745* (2017.02); *B60Q 2500/10* (2013.01); *D03D 1/00* (2013.01); *D03D 13/004* (2013.01); *D03D 15/283* (2021.01); *D03D 15/37* (2021.01); *D03D 15/49* (2021.01); *D03D 15/497* (2021.01); *D03D 15/547* (2021.01); *D10B 2321/042* (2013.01); *D10B 2331/04* (2013.01); *D10B 2401/20* (2013.01); *F21Y 2103/10* (2016.08); *F21Y 2105/10* (2016.08); *F21Y 2115/10* (2016.08); *G02B 5/0215* (2013.01); *G02B 5/0221* (2013.01); *G02B 6/0051* (2013.01); *G02B 6/0061* (2013.01); *G02F 1/133603* (2013.01); *G02F 1/133606* (2013.01); *G02F 1/133607* (2021.01); *G02F 1/133616* (2021.01); *Y10T 428/24074* (2015.01); *Y10T 428/24091* (2015.01); *Y10T 428/24331* (2015.01); *Y10T 428/24612* (2015.01); *Y10T 428/31* (2015.01); *Y10T 442/164* (2015.04); *Y10T 442/169* (2015.04); *Y10T 442/3114* (2015.04); *Y10T 442/3325* (2015.04); *Y10T 442/387* (2015.04); *Y10T 442/3854* (2015.04); *Y10T 442/431* (2015.04)

(56) References Cited

U.S. PATENT DOCUMENTS

| | | | | |
|---|---|---|---|---|
| 6,103,642 | A * | 8/2000 | Arai | B32B 27/12 |
| | | | | 442/62 |
| 6,464,381 | B2 * | 10/2002 | Anderson, Jr. | H01H 9/18 |
| | | | | 362/153 |
| 6,468,629 | B1 * | 10/2002 | Lodder | B32B 5/18 |
| | | | | 428/158 |
| 6,604,309 | B1 * | 8/2003 | Phua | B32B 27/12 |
| | | | | 40/560 |
| D632,811 | S * | 2/2011 | Canales | B32B 7/04 |
| | | | | D25/138 |
| 8,888,334 | B2 | 11/2014 | Hansch | |
| 2003/0194540 | A1 * | 10/2003 | Fusco | B32B 27/04 |
| | | | | 428/195.1 |
| 2004/0017687 | A1 * | 1/2004 | Misaras | B60Q 3/66 |
| | | | | 362/489 |
| 2004/0037091 | A1 * | 2/2004 | Guy | G02B 6/001 |
| | | | | 362/582 |
| 2004/0053040 | A1 * | 3/2004 | Goodson | B32B 37/185 |
| | | | | 428/326 |
| 2004/0108746 | A1 * | 6/2004 | Elliott | B60J 7/104 |
| | | | | 296/100.16 |
| 2005/0191464 | A1 * | 9/2005 | Takahashi | B32B 27/12 |
| | | | | 428/141 |
| 2005/0287890 | A1 * | 12/2005 | Herrmann | B32B 23/042 |
| | | | | 442/6 |
| 2006/0007059 | A1 * | 1/2006 | Bell | G06F 1/163 |
| | | | | 345/55 |
| 2006/0014453 | A1 * | 1/2006 | Maia | B32B 27/12 |
| | | | | 442/41 |
| 2006/0262310 | A1 * | 11/2006 | Starry | G02B 6/0051 |
| | | | | 356/429 |
| 2008/0205035 | A1 * | 8/2008 | Asvadi | G09F 9/33 |
| | | | | 362/103 |
| 2009/0291606 | A1 * | 11/2009 | Malhomme | G02B 6/001 |
| | | | | 442/301 |
| 2010/0059900 | A1 * | 3/2010 | Cushing | B32B 27/04 |
| | | | | 264/108 |
| 2010/0085753 | A1 * | 4/2010 | Van Pieterson | G09F 9/33 |
| | | | | 362/249.02 |
| 2010/0130081 | A1 * | 5/2010 | Fischer | D03D 1/00 |
| | | | | 442/181 |
| 2010/0195337 | A1 * | 8/2010 | Heite | C09K 11/565 |
| | | | | 362/459 |
| 2010/0196693 | A1 * | 8/2010 | Kim | B32B 5/02 |
| | | | | 428/292.1 |
| 2010/0214795 | A1 * | 8/2010 | Salter | B60Q 3/54 |
| | | | | 362/488 |
| 2010/0226117 | A1 * | 9/2010 | Krans | G09F 13/00 |
| | | | | 362/97.1 |
| 2010/0285274 | A1 | 11/2010 | Fukunaga | |
| 2011/0002138 | A1 * | 1/2011 | Hayes | B60Q 3/54 |
| | | | | 362/551 |

(56) References Cited

U.S. PATENT DOCUMENTS

| | | |
|---|---|---|
| 2011/0227240 A1 | 9/2011 | Sostmann et al. |
| 2011/0241052 A1* | 10/2011 | Bhattacharya .......... G09F 13/22 257/98 |
| 2012/0063154 A1* | 3/2012 | Cannon .................... B60Q 3/64 362/490 |
| 2012/0088063 A1* | 4/2012 | Kozar .................... B29C 70/06 428/114 |
| 2012/0127704 A1 | 5/2012 | Hänsch |
| 2012/0155065 A1* | 6/2012 | Ubaghs .................. G09F 21/02 362/103 |
| 2012/0156421 A1* | 6/2012 | Davis ..................... B29C 65/18 428/113 |
| 2012/0206932 A1* | 8/2012 | Peng ........................ D03D 1/00 362/551 |
| 2012/0258303 A1* | 10/2012 | Buhring .................. B32B 27/18 428/318.6 |
| 2012/0327654 A1* | 12/2012 | Bhattacharya ........... D04B 1/14 362/235 |
| 2013/0183480 A1* | 7/2013 | Rock ...................... D03D 15/49 428/91 |
| 2013/0285407 A1* | 10/2013 | Gustavsson ............ B60J 7/1226 296/107.01 |
| 2013/0301287 A1* | 11/2013 | Schlemmer .............. B60Q 3/54 362/511 |
| 2014/0111742 A1* | 4/2014 | Han ...................... G02B 5/0278 349/64 |
| 2014/0211498 A1 | 7/2014 | Cannon et al. |
| 2014/0242865 A1* | 8/2014 | Umeda ................... B32B 17/04 442/71 |
| 2014/0254195 A1* | 9/2014 | Toyooka .............. G02B 6/0051 362/609 |
| 2014/0376241 A1* | 12/2014 | Hayashi ................. B60Q 3/745 362/459 |
| 2015/0003090 A1* | 1/2015 | Mugge .................... F21S 43/26 362/510 |
| 2015/0022757 A1* | 1/2015 | Toyooka ........... G02F 1/133606 349/64 |
| 2015/0177436 A1* | 6/2015 | Zimmermann .......... D03D 1/00 362/510 |
| 2016/0089851 A1 | 3/2016 | Drexler et al. |
| 2016/0200079 A1* | 7/2016 | Mielke ..................... B32B 5/18 428/159 |
| 2016/0229338 A1* | 8/2016 | Sato ....................... B60R 13/02 |
| 2016/0230451 A1* | 8/2016 | Hansch .................. D03D 11/00 |
| 2016/0252777 A1* | 9/2016 | Toyooka ........... G02F 1/133603 362/97.1 |
| 2016/0280128 A1* | 9/2016 | Cannon .................... B60Q 3/14 |
| 2017/0082259 A1* | 3/2017 | Riethmuller ............. F21V 11/14 |
| 2017/0291536 A1* | 10/2017 | Cannon .................. B32B 9/047 |
| 2017/0342607 A1* | 11/2017 | Yamada ................. D03D 15/00 |
| 2018/0087765 A1* | 3/2018 | Horter .................... F21V 7/0016 |
| 2018/0245754 A1* | 8/2018 | Gensler .................... F21V 3/10 |
| 2019/0023195 A1* | 1/2019 | Khayat .................... B60Q 1/26 |
| 2019/0101794 A1* | 4/2019 | Liu ................... G02F 1/133553 |
| 2019/0126853 A1* | 5/2019 | Cannon .................... B60Q 3/54 |
| 2019/0135199 A1* | 5/2019 | Galan Garcia ...... H03K 17/975 |
| 2019/0277476 A1* | 9/2019 | Crompvoets ......... F21V 3/0625 |
| 2019/0283667 A1* | 9/2019 | Eitel ........................ B60Q 3/64 |
| 2020/0055429 A1* | 2/2020 | Drbohlav ............... B60Q 3/233 |
| 2020/0116906 A1* | 4/2020 | Roth ................... G02B 5/0278 |
| 2020/0139814 A1* | 5/2020 | Galan Garcia ........... B32B 3/08 |
| 2020/0262341 A1* | 8/2020 | Persson .................. B60Q 3/217 |
| 2020/0346431 A1* | 11/2020 | Juenemann ............. B60Q 3/217 |

FOREIGN PATENT DOCUMENTS

| | | | | |
|---|---|---|---|---|
| CN | 102482808 A | | 5/2012 | |
| CN | 203646916 U | * | 6/2014 | |
| CN | 105459546 A | | 4/2016 | |
| DE | 102004010974 A1 | * | 10/2005 | ............ B60R 13/02 |
| DE | 102004016130 A1 | * | 10/2005 | ............ G02B 6/001 |
| DE | 102005038680 A1 | | 2/2006 | |
| DE | 102005036533 A1 | * | 2/2007 | ............ B60Q 3/745 |
| DE | 102006023604 A1 | * | 11/2007 | ............ B60R 13/02 |
| DE | 102008045015 A1 | | 3/2010 | |
| DE | 102012111187 A1 | * | 5/2014 | ............ B32B 5/22 |
| DE | 102014005663 A1 | | 10/2015 | |
| EP | 0648610 A1 | | 4/1995 | |
| EP | 1028348 A1 | * | 8/2000 | ......... G09F 13/0409 |
| EP | 2174783 A1 | * | 4/2010 | ......... D06M 15/256 |
| EP | 2233366 A1 | * | 9/2010 | ............ B60Q 3/54 |
| EP | 2233366 A1 | | 9/2010 | |
| EP | 2284306 A1 | | 2/2011 | |
| EP | 2520195 A1 | | 11/2012 | |
| EP | 2762362 A1 | | 8/2014 | |
| EP | 2862968 A1 | | 4/2015 | |
| JP | 04136913 A | * | 5/1992 | |
| JP | 08160205 A | * | 6/1996 | |
| JP | 08201606 A | * | 8/1996 | |
| JP | 09304602 A | * | 11/1997 | |
| JP | 10269826 A | * | 10/1998 | |
| JP | 2005189583 A | * | 7/2005 | |
| JP | 2007140495 A | * | 6/2007 | |
| JP | 2007140499 A | * | 6/2007 | |
| JP | 2007164164 A | * | 6/2007 | |
| JP | 2007219534 A | * | 8/2007 | |
| JP | 2007298604 A | * | 11/2007 | |
| JP | 2009018747 A | * | 1/2009 | |
| JP | 2010078989 A | * | 4/2010 | |
| JP | 2013140245 A | * | 7/2013 | |
| JP | 2015197614 A | * | 11/2015 | |
| JP | 2016141358 A | * | 8/2016 | ............ B60Q 3/54 |
| JP | 2016186620 A | * | 10/2016 | |
| KR | 20110002716 A | * | 1/2011 | ............ B60Q 3/54 |
| TW | 278704 B | * | 4/2007 | |
| WO | WO-2007046274 A1 | * | 4/2007 | ......... G02B 5/0278 |
| WO | WO-2010126182 A1 | * | 11/2010 | ......... G02B 5/0242 |
| WO | WO-2010126183 A1 | * | 11/2010 | ......... G02B 5/0231 |
| WO | 2014124817 A1 | | 8/2014 | |
| WO | WO-2018114300 A1 | * | 6/2018 | ......... B29C 48/0012 |

OTHER PUBLICATIONS

Machine Translation of JP-2005189583-A, Jul. 2005 (Year: 2005).*
Machine Translation of DE-102012111187-A1, May 2014 (Year: 2014).*
Machine Translation of EP-2233366-A1, Sep. 2010 (Year: 2010).*
International Search Report dated Sep. 14, 2018 of International Application PCT/EP2018/065417 on which this application is based.
Xu Jun et al / Sensor principle and application / Aug. 31, 2010—Cited in NPL No. 4.
Zong Yaning et al / Textile Materials Science Edition 2 / Jun. 30, 2013—Cited in NPL No. 4.
Nader Jalili / Vibration Control Based on Piezoelectric Materials / Mar. 31, 2017—Cited in NPL No. 4.
Chinese Office Action dated Jan. 20, 2022 of application 201880056320.5 which is counterpart of this application.

* cited by examiner 1,3

LIGHT-PERMEABLE MULTI-LAYER COMPOSITE FILM

The invention relates to a light-permeable multilayer composite film made of plastic as the surface coating of an article, wherein the composite film comprises at least one outer, at least partially light-permeable/transparent top layer optionally provided with a lacquer and at least one layer arranged on the back of the top layer.

Films in the form of multilayer composite films for coating and as surfaces of all manner of articles are well known in the prior art, for instance in the surface finish of furniture and interior trim pieces of vehicles, in particular of motor vehicles. In the case of the latter, flexible, grained, patterned or finely structured plastic skins are used as surfaces for interior trim, often as relatively soft foam-backed films having pleasant haptics, for instance for trimming dashboards or interior door panels etc. With appropriate adaptation for strength and design such films are of course also utilized for other high-quality coated products.

Films for the interior trim of motor vehicles, for furniture, bags etc., commonly also referred to as imitation leather, often have a multi-layered structure, are often foam-backed and show three-dimensionally structured surfaces having a wide variety of shapes and configurations on their top side. The multi-layered structure generally consists of an upper top layer or decorative layer, which is provided with the embossed or impressed surface, and one or more lower layers. The top layer is generally provided with a coating layer and may also be colored. Formulating the layers appropriately, including by adapting softness or using the abovementioned foamed layers, results in appealing haptics, i.e. a pleasingly "soft" feel of the plastic film and also a certain gloss.

The prior art discloses various processes for producing such plastic skins, for example rolling and/or embossing processes for producing "endless" film webs made of thermoplastic material or processes for producing individual molded skins, i.e. plastic moldings.

The ever-increasing demand for comfort features not only in the field of vehicle equipment has the result that there is a desire for ever increasing individualization of articles and the integration of functions into everyday articles and their surfaces is today also being brought to the attention of the customer.

Staying with vehicles, covering materials/flexible surface materials are thus now being incorporated into the control systems of motor vehicles as functional, sensor or signalling elements.

With respect to the integration of illumination elements or indicator lights into surface layers it has also been proposed to attach electroluminescent elements or layers into or onto components and trim pieces for the interior of motor vehicles.

Thus CA 2 454 911 A1 discloses a vehicle headlining as a molding provided with strip-like electroluminescent elements. The vehicle headlining in this case consists of a molded carrier that is pressed with a coating film to afford a component. Electroluminescent elements are thereby initially positioned in the carrier, passed through the carrier with their connection cables and then covered, fixed and compressed with the applied coating film. The disadvantage here, however, is the relatively complicated design and manufacture. In addition, the electroluminescent elements behind the decorative surface/coating film may also become visible as bulges in this embodiment.

DE 10 2005 038 680 A1 discloses a component of a motor vehicle having a three-dimensional surface which comprises an electroluminescent layer and is film-insert molded with thermoplastic material to fix the component shape. This method is thus essentially used to produce relatively small, non-flexible lighting elements, for example illuminated switches or illuminating elements. The production of larger parts is rather difficult with this embodiment.

DE 10 2008 045 015 A1 discloses a process for producing a molded skin comprising an embedded sheetlike electroluminescent element, wherein an outer functional or carrier layer of the electroluminescent element is produced from plastic material which is substantially identical to the pulverulent plastic material of the molded skin and is applied to the not yet completely hardened and cooled molded skin. Here too, the production of relatively large parts is difficult irrespective of the fact that endless production of rolls of material for coating in a cost-effective rolling or calendering process for example is impossible.

The use of flexible fabrics to achieve light effects on surfaces has likewise been considered. Textile fabrics in particular are mentioned in the prior art. Thus DE 10 2014 005 663 A1 discloses an illuminating element comprising a textile fabric for producing light effects, wherein the textile fabric is attached to an adhesive or fastening means such that the light emission surface is covered by the textile fabric while simultaneously stresses are introduced into the textile fabric to guard against aging effects, for example sagging of the textile fabric. However, the document is more concerned with illuminating elements, i.e. lights as such and not for instance coatings for the surfaces of articles comprising an illuminating function.

A sheetlike light guide system in which a textile fabric as such produces particular optical effects is disclosed in EP 2 862 968 A1. Proposed for a roller blind are particular warp and weft threads which exhibit particular transmission, refraction and reflection properties and also light conducting properties for incident light on account of their geometric configurations in terms of thread cross section, in particular a noncircular thread cross section with uniform orientation of the lateral sections, and on account of their partial transparency. However, such a textile fabric is difficult to use as a dimensionally stable coating for surfaces of any desired shape without reducing the light conducting properties through the forming operation.

The problem addressed by the present invention is accordingly that of providing a film for the surface coating of articles which includes a functionalization in the form of an illumination or the sending of optical signals by means of which it is possible to integrate into a surface material a decorative effect illumination or light pattern display and which also has a high efficiency based on the ratio of light input or supply to light output/luminosity.

This problem is solved by the features of the main claim. Further advantageous embodiments are disclosed in the subclaims.

Arranged on the back side of the top layer is at least one sheetlike textile layer, preferably a textile layer comprising threads made of polyethylene terephthalate (PET) and/or made of polyvinylidene fluoride (PVDF), wherein the textile layer has light-transmitting, light-refracting and light-reflecting properties or a combination thereof, i.e. is optically active/has optical properties. The transmission, refraction and reflection properties are such that illumination of the textile layer, in particular back side illumination of the textile layer, results in light transmission, preferably uniformized light transmission, through the top layer. The term "uniformized" is here to be understood as meaning that, with regard to a certain surface region, illumination of equal intensity of the top layer/uniform light emission from the top layer, is achieved.

It will be appreciated that the optical properties of the textile layer may also be established such that illumination of varying intensity/light emission from the top layer of varying intensity is achieved over certain surface regions. This makes it possible to establish a wave structure or other decorative embodiments of the illumination for example.

Illumination of the textile layer may be achieved either via for example light emitting diodes from the back side, or else by glass fibers from the side or from the back side, but in any case in such a way that light enters into the textile layer and is therein conducted in a diffuse or directed manner according to the properties of said layer so that in combination with the top layer the latter is illuminated/transmits light and appears translucent, transparent or autoluminous from the outside. Accordingly, the entire component upon which the multilayer composite film is arranged as the surface coating may be used as a lighting element or signalling element and may be switched on or off as desired.

The concept underlying the technical solution is thus not only that a light-permeable layer, here the top layer, is transilluminated on the back side but also that a further optically active textile layer is placed behind the layer to be transilluminated which as a result of its special optical properties has the result that a particular and pleasant light distribution and transillumination of the outer top layer is ultimately achieved.

The invention is substantially directed to flexible multilayer composite films made of plastic which in their composite structure typically also contain a foam layer or are foam-backed to achieve a pleasant "feel". It will be appreciated that such light-permeable flexible films are already suitable as a surface coating of an article for the mere fact that their flexibility allows them to adapt to all possible surface configurations and three-dimensional designs of an article when they are for example adhesively bonded to the surfaces of articles. However it will also be appreciated that more or less rigid or inflexible films which for instance themselves already form a type of molded article may also have the inventive structure comprising an optically active textile layer backing.

The threads of the textile layer are preferably made of a substantially glass-clear or translucent polyethylene terephthalate (PET), which depending on the processing conditions is producible as a semicrystalline (PET-C) or amorphous polyethylene terephthalate (PET-A), or else of polyvinylidene fluoride (PVDF).

Provided clouding through excessive crystallinity is avoided, the use of PET threads affords not only very good optical properties but also, depending on the thickness and configuration, a very flexible textile layer which may be readily combined, laminated and further processed with further plastic layers.

However, the use of PVDF also has advantages. Since this material shows strong piezoelectric effects after appropriate polarization, at least in comparison to other polymers, its optical properties may even be altered when a voltage is applied to the textile layer.

In an advantageous development the transmission, refraction and reflection properties of the textile layer are influenced or determined by their thread arrangement, thread geometry, thread density and thread structure, preferably by a thread cross section that at least partially differs from a round cross section. This makes it possible for example through particular geometric configurations of the fiber cross section, for instance through hexagonal threads formed in the fiber cross section, to form intensely diffusely illuminated surfaces.

In a further advantageous embodiment material or thread consolidations, thread entanglements or thread detanglements which influence or alter the transmission, refraction and reflection properties have been introduced into the textile layer. Thus thread consolidations or "knots" provided in the illumination surface can result in a different light transmission through the top layer compared to regions with few textile threads in the optically active layer, thus producing patterns of any desired design.

In a further advantageous embodiment the textile layer consists at least in part of a knitted fabric or of a woven fabric of warp and weft threads. When a woven fabric is provided the textile layer preferably comprises at least one such woven fabric layer. Such a configuration as a knitted fabric or fabric promotes uniformization of light transmission for example, especially when the threads, optionally the weft or warp threads, have different cross-sectional shapes.

Similar advantages can be achieved by a further embodiment in which the knitted fabric or the woven fabric layer is made of textured threads or textured warp and/or weft threads. The texturing provides filament yarns that were originally smooth with a type of crimped structure, thus providing the woven fabric with a "texture". This also promotes rather diffuse light transmission and thus an opaque-seeming illumination of the top layer.

In a further advantageous embodiment the partially light-permeable/transparent top layer has a texture or a relief, wherein in a multiplicity of subregions or surface points the top layer is reduced down to a residual layer thickness. In the art such a surface character or finish is referred to as "semi-perforation" and is likewise preferably carried out by embossing.

This comprises treating the top layer with appropriately configured embossing tools or pinwheels, for example with circular or rhombic needle tips, so as to form a type of hole pattern with holes that do not extend through the total thickness of the top layer and externally or in section are roughly comparable to blind holes. Semi-perforation or decorative perforation thus describes the impression of a perforation, but without any actual perforation of the surface or of the surface material.

This impression may be amplified by coloring/pigmenting the film or through a color printing technique in which the film base material has a lighter colored or more translucent color tone than the surface print which does not extend into the depressions. The reduced layer thickness of the top layer in the holes in any case has the result that the transmission of light from the textile layer therebehind is substantially more intense as a result of these "thinned residual layers" than in the non-thinned regions. The hole pattern—of non-perforating "holes"—thus appears to the observer as a translucent light pattern. This also makes it possible to display inter alia letters, pictograms or pictures, for example also warnings or requests for action.

In a further advantageous embodiment the transmission, refraction and reflection properties in the top layer may be altered or influenced through introduction of discontinuities/irregularities into said layer in the material or in its structure. Here too the material of the top layer may be influenced on a region-by-region or point-by-point basis for example by irradiation with a laser of a suitable frequency. Thus for example the degree of crystallinity or the crosslinking or polymerization in the top layer material may be influenced or altered at certain points or areas by supplying energy, for example by irradiation with a laser of a suitable frequency. A greater degree of crosslinking of the chains results in different behavior upon light conduction/transmission of light.

In a further advantageous embodiment the top layer is perforated, preferably provided with linear or areal perforation patterns. This makes it possible to very easily create decorative patterns by for example performing a linear perforation such that letters, pictograms or pictures are formed. One example of such a decorative pattern is a multilayer composite film for a vehicle headlining in which the patterns of constellations are introduced into the top layer by perforation.

In a further advantageous and easy to produce embodiment the top layer consists substantially of a thermoplastic polyolefin (TPO). Such top layers are for example very easy to produce by film-insert molding of a grained TPO film.

In a further advantageous embodiment the top layer comprises a top coat of polyvinyl chloride (PVC) and a foam coat arranged on the back of the top coat. This makes it possible to achieve different embodiments of "haptics" and tactile feel in very simple fashion.

It will be appreciated that the list of these materials is not to be understood as exhaustive. In addition to TPO or PVC other materials such as for instance polyurethane (PUR) or various hybrid forms may also be used as top layers. The number of layers which together with the optically active textile layer are combined to form a laminate/a layer composite film is also not stipulated. What is essential in all of these constructions is that the underlying general solution concept is retained, namely that at least one optically active textile layer whose optical properties improve the translucency or transparency of the overall layer package is always present.

Such multilayer composite films are particularly advantageously employable as interior trim parts for vehicles, wherein the interior trim part comprises a carrier on the outside of which the light-permeable multilayer composite film according to the invention is provided. A dashboard for example can thus very easily be provided with such a multilayer composite film. In this case a light source is arranged between the carrier and the multilayer composite film, preferably one or more LED lights arranged in a sheetlike or ribbonlike configuration. These lights may either be arranged at a distance from the rear of the optically active textile layer, i.e. for instance on a grid of appropriate height arranged on the back side of the textile layer, or it may be secured directly to the back side of the textile layer. It will be appreciated that light guides may be used here too and these may either shine directly into the textile layer from the side or from behind or may likewise be arranged at a distance from the back side of the textile layer.

It is equally advantageous to design any type of furniture having a light-permeable multilayer composite film arranged on its outside, wherein here too for example one of the abovementioned light sources is arranged between the carrier and the multilayer composite film at a distance or in direct contact with the textile layer.

Figure 2:
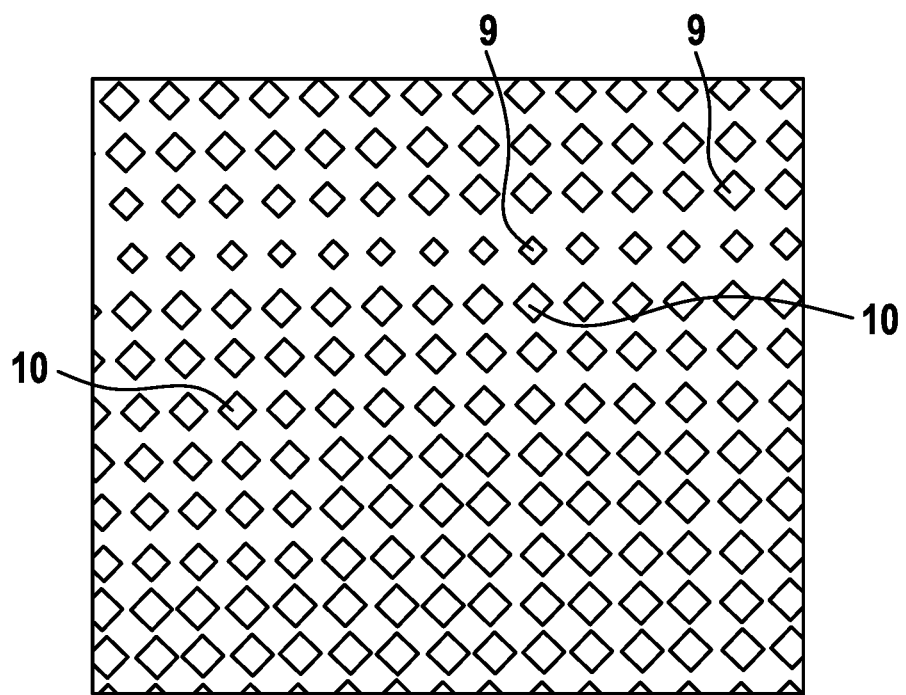
Figure 3:
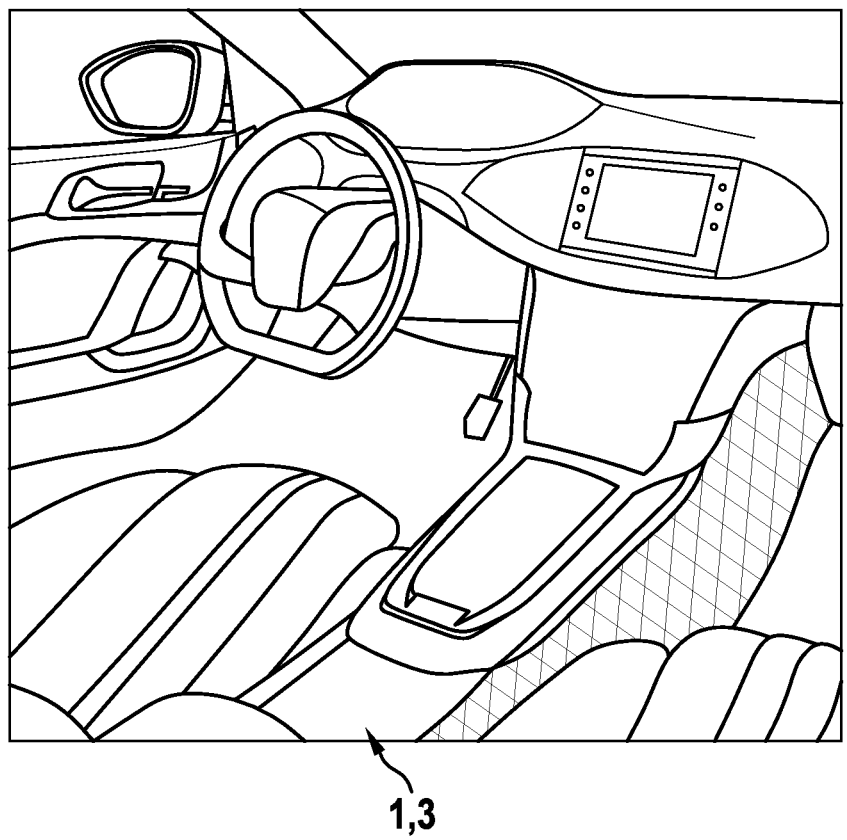
Figure 4:
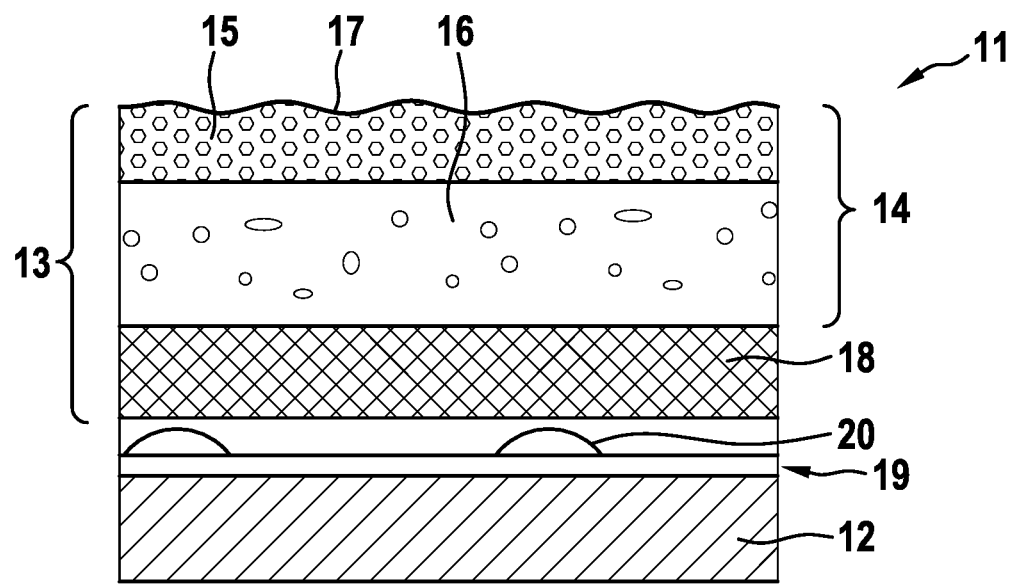

The invention will be explained in more detail with reference to an exemplary embodiment. In the drawings:

FIG. 1 Shows a section of a motor vehicle interior trim part which is provided with a multilayered composite film according to the invention having a TPO top layer, FIG. 2 Shows a plan view and an enlargement of the top layer 4, FIG. 3 Shows an arrangement of a interior trim part according to the invention in a vehicle, FIG. 4 Shows a section of another interior trim part for a vehicle which is provided with a multilayer composite film according to the invention which comprises as a top layer a top coat and, arranged on the back of the top coat, a foam coat made of PVC.

FIG. 1 shows a section of an interior trim part 1 for a center console for a motor vehicle, wherein the interior trim part is provided with a multilayer composite film 3 according to the invention.

This interior trim part comprises a carrier 2 on the outside of which is arranged a multilayer composite film 3 whose top layer 4 consists substantially of a thermoplastic polyolefin (TPO). The composite film is provided on its outside with a transparent lacquer 5, wherein the top layer 4 is in turn likewise transparent, namely partially light-permeable. In this context partially light-permeable is to be understood as meaning that the top layer 4 does not behave like virtually completely light-permeable glass but rather transmits a certain percentage of the light incident on its back side and reflects or absorbs a further percentage.

Arranged on the back side of the top layer is a textile layer 6, namely an optically active textile layer, which substantially comprises threads of polyethylene terephthalate (PET) and thus has a combination of optical properties, namely light-transmitting, light-refracting and light-reflecting properties but here substantially transmits light. These transmission, refraction and reflection properties are such that back side illumination of the textile layer 6 results in light transmission also through the partially light-permeable top layer 4.

Provided between the carrier 2 and the multilayer composite film 3 is a light source 7 composed of a plurality of LED lights 8 arranged on conducting tapes which are arranged at regular intervals over a certain surface area of the carrier 2 and directly adjacent to the textile layer 6.

The textile layer 6 is here in the form of a knitted fabric (not shown in any detail) made of textured PET threads. As shown above the texturing brings about a rather diffuse light transmission and thus an opaque-seeming illumination of the top layer 4. This results in a wide and uniform distribution of the light within the textile layer and thus also with regard to the transillumination of the top layer 4 with the light from the LED lights 8. Although discrete LED lighting elements are present here, transillumination of the top layer which appears uniform without "light spots" is achieved.

FIG. 2 shows in the form of a plan view and an enlargement the top layer 4 which is partially light-permeable and also has a textured surface. The texture of a surface is to be distinguished from the above-described "texturing" of threads. The texture of the surface is as a result of the fact that the top layer has been reduced down to a residual layer thickness in a multiplicity of subregions or surface points, i.e., as explained hereinabove, provided with a "semi-perforation" produced by embossing.

The top layer has here been provided with a multiplicity of rhombic stampings or depressions 9, 10 of different sizes, each having a base area of 1 to 2 $mm^2$, thus creating a pattern comprising blind holes that do not extend through the total thickness of the top layer. It will be appreciated that the rhombic shape is only one of many possible embodiments of stampings, and circular, elongate or oval stampings or a mixture thereof may be introduced just as readily.

The reduced layer thickness of the top layer in the holes then has the result that the transmission of the light from the optical film therebehind is substantially more intense as a result of these "thinned residual layers" than in the non-thinned regions, though the top layer still gives an overall impression of being opaque. The hole pattern thus appears to the observer as a uniformly shimmering, translucent light pattern.

FIG. 3 shows by way of example the arrangement of the interior trim piece 1 provided with a TPO-based translucent composite film 3 according to the invention in a vehicle. The illuminated outer surface of the cockpit center console allows not only for lighting with great effect but also for the driver to be given signals that increase safety in road traffic.

FIG. 4 shows a section of a further interior trim part 11 for a vehicle provided with a multilayer composite film 13 according to the invention whose top layer 14 comprises a top coat 15, i.e a top layer made of PVC and a PVC foam coat 16 arranged on the back side of the top coat.

The interior trim piece has a carrier 12 on the outside of which the multilayer composite film 13 is provided. The composite film is provided on its outside with a transparent lacquer 17. Arranged on the back side of the top layers 14, i.e. on the back side of the foam coat 16, is a textile layer 18 such as has already been described under FIG. 1 in the above exemplary embodiment of a TPO top layer. The textile layer has the same configuration and optical effect as in the above exemplary embodiment with a TPO top layer. The transmission, refraction and reflection properties are such that back side illumination of the textile layer 18 results in light transmission also through the partially light-permeable top layers 14, i.e. through the top coat 15 and the foam coat 16.

Arranged between the carrier 12 and the multilayer composite film 13 is a light source 19 composed of a plurality of LED lights 20 arranged in a sheet like configuration on conducting tapes which are arranged at regular intervals over a certain area of the carrier 12 and directly adjacent to textile layer 18.

LIST OF REFERENCE NUMERALS (Part of the Description)
1 Interior trim piece
2 Carrier
3 Multilayer composite film
4 Top layer
5 Lacquer
6 Textile, optically active layer
7 Light source
8 LED light
9 Rhombic depression (blind hole)
10 Rhombic depression (blind hole)
11 Interior trim piece
12 Carrier
13 Multilayer composite film
14 Top layer
15 Top coat
16 Foam coat
17 Lacquer
18 Textile, optically active layer
19 Light source
20 LED light

The invention claimed is:

1. A light-permeable multilayer composite film made of plastic as the surface coating of an article, wherein the composite film comprises at least one outer and at least partially light-permeable top layer optionally provided with a lacquer;
   wherein arranged on the back side of the top layer is at least one sheetlike, optically active textile layer comprising threads made of polyethylene terephthalate (PET) and/or made of polyvinylidene fluoride (PVDF);
   wherein the textile layer has one or more of light-transmitting, light-refracting or light-reflecting properties, or a combination thereof, and the transmission, refraction and/or reflection properties are such that back side illumination of the textile layer results in uniformized light transmission through the top layer;
   wherein the transmission, refraction and/or reflection properties of the textile layer are influenced by a hexagonal cross section of the threads;
   wherein consolidations of the threads in the form of knots influence the transmission, refraction and/or reflection properties of the textile layer; and,
   wherein the top layer has a textured or relieved surface in the form of rhombic depressions, and
   wherein in a multiplicity of subregions or surface points the top layer is reduced down to a residual layer thickness.

2. The light-permeable multilayer composite film as claimed in claim 1, wherein the textile layer consists at least partially of a knitted fabric or of a woven fabric of warp and weft threads.

3. The light-permeable multilayer composite film as claimed in claim 1, wherein the textile layer comprises textured threads or textured warp and/or weft threads.

4. The light-permeable multilayer composite film as claimed any of claim 1, wherein the rhombic depressions in the top layer alter the transmission, refraction and/or reflection properties of the top layer.

5. The light-permeable multilayer composite film as claimed in claim 1, wherein the top layer consists substantially of a thermoplastic polyolefin (TPO).

6. The light-permeable multilayer composite film as claimed in claim 1, wherein the top layer comprises a top coat made of polyvinyl chloride (PVC) and, arranged on the back of the top coat, a foam coat made of PVC.

7. An interior trim part for a vehicle which comprises a carrier on the outside of which a light-permeable multilayer composite film as claimed in claim 1 is provided, wherein a light source is arranged between the carrier and the multilayer composite film, and wherein the light source is one or more LED lights arranged in a sheetlike or ribbonlike configuration.

8. A furniture piece having a light-permeable multilayer composite film according to claim 1 arranged on its outside, wherein a light source is arranged between a carrier and the multilayer composite film, and wherein the light source is one or more LED lights arranged in a sheetlike or ribbonlike configuration.

* * * * *